United States Patent
Conde

(10) Patent No.: US 6,622,426 B2
(45) Date of Patent: Sep. 23, 2003

(54) STACKABLE LANDSCAPE EDGING AND METHODS OF MANUFACTURING AND USING SAME

(75) Inventor: Clemente Conde, Waco, TX (US)

(73) Assignee: Easy Gardener, Inc., Waco, TX (US)

( * ) Notice: Subject to any disclaimer, the term of this patent is extended or adjusted under 35 U.S.C. 154(b) by 0 days.

(21) Appl. No.: 09/766,087

(22) Filed: Jan. 19, 2001

(65) Prior Publication Data

US 2002/0095862 A1 Jul. 25, 2002

(51) Int. Cl.⁷ .............................................. A01G 1/08
(52) U.S. Cl. ........................................................ 47/33
(58) Field of Search .............................. 47/33; 52/102

(56) References Cited

U.S. PATENT DOCUMENTS

| | | | | |
|---|---|---|---|---|
| 557,030 A | * | 3/1896 | Schaefer | 47/33 |
| 3,378,949 A | | 4/1968 | Dorris | 47/33 |
| 3,387,786 A | | 6/1968 | Rynberk | 239/201 |
| 3,484,989 A | | 12/1969 | Lazinsky | 47/33 |
| 3,485,449 A | | 12/1969 | Wilson | 239/201 |
| 3,487,600 A | | 1/1970 | Greene | 52/282 |
| 3,525,663 A | | 8/1970 | Hale | 161/68 |
| 3,545,127 A | | 12/1970 | Jensen | 47/33 |
| 3,701,477 A | | 10/1972 | Matt et al. | 239/276 |
| 3,706,627 A | | 12/1972 | Arne | 161/131 |
| 3,788,001 A | | 1/1974 | Balfanz, Jr. | 47/33 |
| 3,841,022 A | | 10/1974 | Thodos | 47/33 |
| 3,911,187 A | | 10/1975 | Raley | 428/180 |
| 4,074,479 A | | 2/1978 | Krupka | 52/102 |
| 4,146,666 A | | 3/1979 | Houtlosser | 428/180 |
| 4,190,279 A | | 2/1980 | Sguazzin | 294/49 |
| 4,281,473 A | | 8/1981 | Emalfarb et al. | 47/33 |
| 4,321,769 A | | 3/1982 | Tisbo et al. | 47/33 |
| 4,333,979 A | | 6/1982 | Sciaraffa et al. | 428/179 |
| 4,397,902 A | | 8/1983 | Resch | 428/119 |
| 4,644,685 A | | 2/1987 | Tisbo et al. | 47/33 |
| 4,681,302 A | * | 7/1987 | Thompson | 47/33 |
| 4,761,923 A | | 8/1988 | Reum et al. | 52/102 |
| 4,858,379 A | | 8/1989 | West | 47/33 |
| 4,939,865 A | | 7/1990 | Whitcomb et al. | 47/77 |
| 4,955,156 A | | 9/1990 | Williams | 47/25 |

(List continued on next page.)

FOREIGN PATENT DOCUMENTS

| | | | | | |
|---|---|---|---|---|---|
| DE | 29611358 U1 | * | 9/1996 | | A01G/1/08 |
| GB | 2288964 A | * | 11/1995 | | A01G/1/08 |
| JP | 409074903 A | * | 3/1997 | | A01G/1/08 |
| JP | 410252184 A | * | 9/1998 | | A01G/1/08 |
| JP | 02000050730 A | * | 2/2000 | | A01G/1/08 |
| JP | 02000300072 A | * | 10/2000 | | A01G/1/08 |
| JP | 02000354421 A | * | 12/2000 | | A01G/1/08 |

Primary Examiner—Son T. Nguyen
(74) Attorney, Agent, or Firm—O'Keefe, Egan & Peterman, LLP

(57) ABSTRACT

A stackable landscape edging segment is disclosed that can be stacked to form multi-layer landscape edging. The landscape edging segment has an elongated body. A lower stacking connection feature and an upper stacking connection feature are coupled to the elongated body. The upper stacking connection feature is formed to connect to a matching landscape edging segment by engaging with a matching lower stacking connection feature. In one embodiment, the stackable landscape edging segment comprises a plurality of spikes connected to and extending downward from the elongated body. And, each spike includes a lower stacking connection feature. In this embodiment, the stackable landscape edging segment also comprises a plurality of upper stacking connection features, each associated with and aligned with one of the spikes. Further disclosed are methods of manufacturing and using the stackable landscape edging segments.

23 Claims, 5 Drawing Sheets

U.S. PATENT DOCUMENTS

| | | | |
|---|---|---|---|
| 4,965,097 A | 10/1990 | Bach | 428/194 |
| 5,020,272 A | 6/1991 | Herrema et al. | 47/33 |
| 5,117,583 A | 6/1992 | Reum | 47/33 |
| 5,121,569 A | 6/1992 | Thomas | 47/33 |
| 5,201,154 A | 4/1993 | Thomas | 52/102 |
| 5,205,090 A * | 4/1993 | Lavery | 52/102 |
| 5,414,956 A * | 5/1995 | Kheradpir | 47/33 |
| 5,456,045 A | 10/1995 | Bradley et al. | 47/33 |
| 5,615,529 A * | 4/1997 | Johnson et al. | 52/604 |
| 5,930,947 A * | 8/1999 | Eckhoff | 47/33 |

* cited by examiner

STACKABLE LANDSCAPE EDGING AND METHODS OF MANUFACTURING AND USING SAME

TECHNICAL FIELD OF THE INVENTION

This invention relates in general to the field of landscape edging and, more particularly, to stackable landscape edging and methods of manufacturing and using stackable landscape edging.

BACKGROUND OF THE INVENTION

It is often desirable in landscapes and gardens to separate different types of plants and to prevent undesired commingling of plants. For example, it is desirable to separate a lawn area from an area desired to be used as a flower bed or other landscaped non-lawn area. One conventional means for forming a distinct border between areas, such as a lawn area and a garden area, is the use of an edging device along the desired border. For example, conventional edging devices include brick edging, concrete edging, metal edging, plastic edging and other elongated, perhaps flexible edging devices.

Often the edging may be constructed such that lateral ends of the elongated structures may be joined for forming a continuous elongated edging. For many edging purposes, it is desirable that the edging be both relatively inexpensive and easily installed.

SUMMARY OF THE INVENTION

In accordance with the present invention, stackable landscape edging and methods of manufacturing and using stackable landscape edging are disclosed that provide advantages over conventional edging devices and methods.

According to one aspect of the present invention, a stackable landscape edging segment has an elongated body. A lower stacking connection feature and an upper stacking connection feature are coupled to the elongated body. The upper stacking connection feature is formed to connect to a matching landscape edging segment by engaging with a matching lower stacking connection feature.

In one embodiment, the stackable landscape edging segment comprises a plurality of spikes connected to and extending downward from the elongated body. And, each spike includes a lower stacking connection feature. In this embodiment, the stackable landscape edging segment also comprises a plurality of upper stacking connection features, each associated with and aligned with one of the spikes.

Further, in this embodiment, each lower stacking connection feature comprises a pair of openings formed in the spike at a position proximate the elongated body and a pair of tabs extending from the spike at a position distal the elongated body. Each of the upper stacking connection features comprises a second pair of tabs extending from the elongate body at a position distal an associated spike and a pair of notches in the elongate body at a position proximate an associated spike. The second pair of tabs are formed to engage the pair of openings of a matching lower connection feature, and the pair of notches are formed to receive the pair of tabs of a matching lower connection feature.

According to another aspect of the present invention, multi-layer stacked landscape edging comprises multiple segments. A first landscape edging segment has an upper stacking connection feature, and a second landscape edging segment has a lower stacking connection feature. The lower stacking connection feature and the upper stacking connection feature are formed to engage with one another to connect the second landscape edging segment above the first landscape edging segment. In one embodiment, the connection features are formed as above.

According to a further aspect of the present invention, a method is provided for using stackable landscape edging segments. A first landscape edging segment is selected for a lower layer, and a second landscape edging segment is selected for an upper layer. The second landscape edging segment is then aligned with the first landscape edging segment, and stacking connection features of the two segments are engaged to form multi-layer landscape edging. Further, if present, stylistic features can be removed from the top of the first landscape edging segment prior to engaging the connection features.

According to an additional aspect of the present invention, a method is disclosed for manufacturing a stackable landscape edging segment. An elongated body is formed, and a lower stacking connection feature and an upper stacking connection feature are formed and coupled thereto. The upper stacking connection feature is formed to connect to a matching landscape edging segment by engaging with a matching lower stacking connection feature. In one embodiment, the connection features are formed to have the features mentioned above.

A technical advantage of the present invention is that multiple landscape edging segments can be stacked on top of one another to form edging having a desired height. The same segments can be used to form edging with one layer, two layers or more layers.

Another technical advantage of the present invention is that it provides a relatively inexpensive and easily installed edging solution.

BRIEF DESCRIPTION OF THE DRAWINGS

A more complete understanding of the present invention and advantages thereof may be acquired by referring to the following description taken in conjunction with the accompanying drawings, in which like reference numbers indicate like features. It is to be noted, however, that the accompanying drawings illustrate only exemplary embodiments of the invention and are therefore not to be considered limiting of its scope, for the invention may admit to other equally effective embodiments.

DETAIL DESCRIPTION OF THE INVENTION

Figure 1:
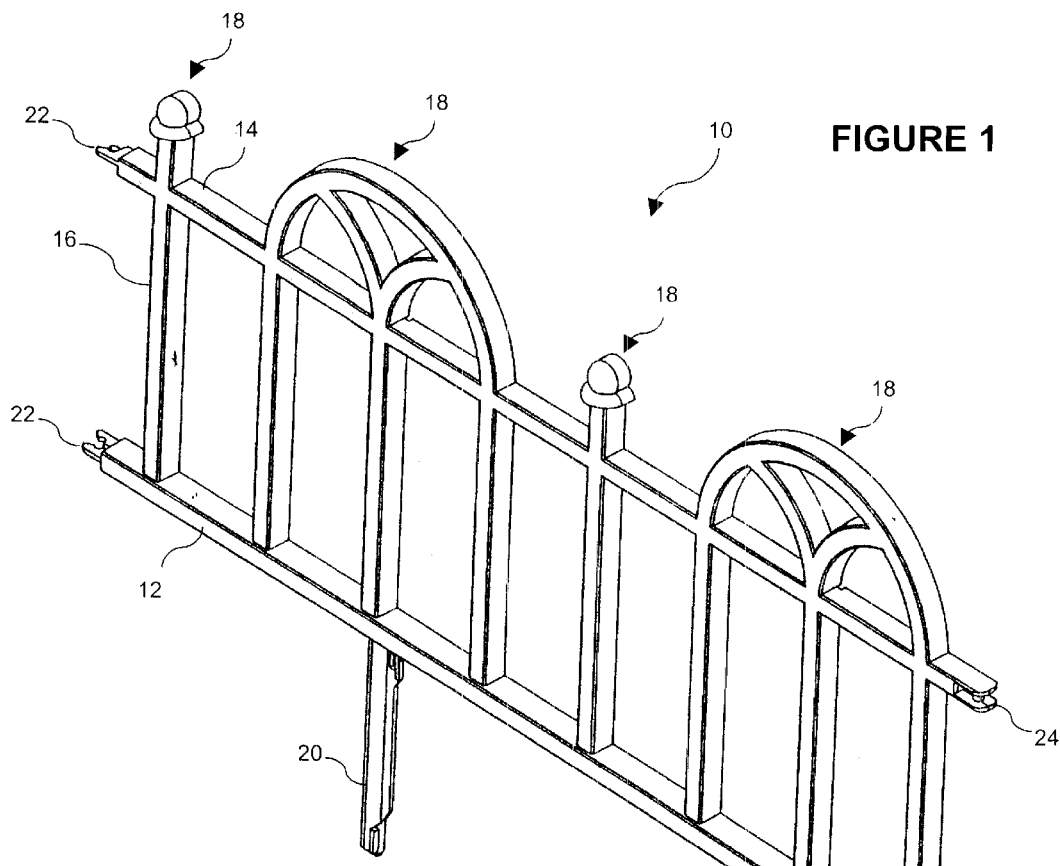
FIGS. 1 and 1A are front perspective views of one embodiment of a segment of landscape edging in accordance with the present invention.

FIG. 1 is a front perspective view of one embodiment of a segment, indicated generally at 10, of landscape edging in accordance with the present invention. Segment 10 has a lower horizontal member 12 and an upper horizontal member 14 extending the length of segment 10 and oriented generally parallel with one another. Horizontal members 12 and 14 are connected by a plurality of vertical members 16 oriented generally perpendicular to horizontal members 12 and 14. Together, members 12, 14 and 16 form a generally elongated body for segment 10. A plurality of stylistic features 18 are connected to upper horizontal member 14 and extend upward away from lower horizontal member 12. In the embodiment of FIG. 1, there are eight vertical members 16 and four stylistic features 18, and stylistic features 18 comprise alternating arches and posts having legs that align with vertical members 16, as shown.

Figure 1A:
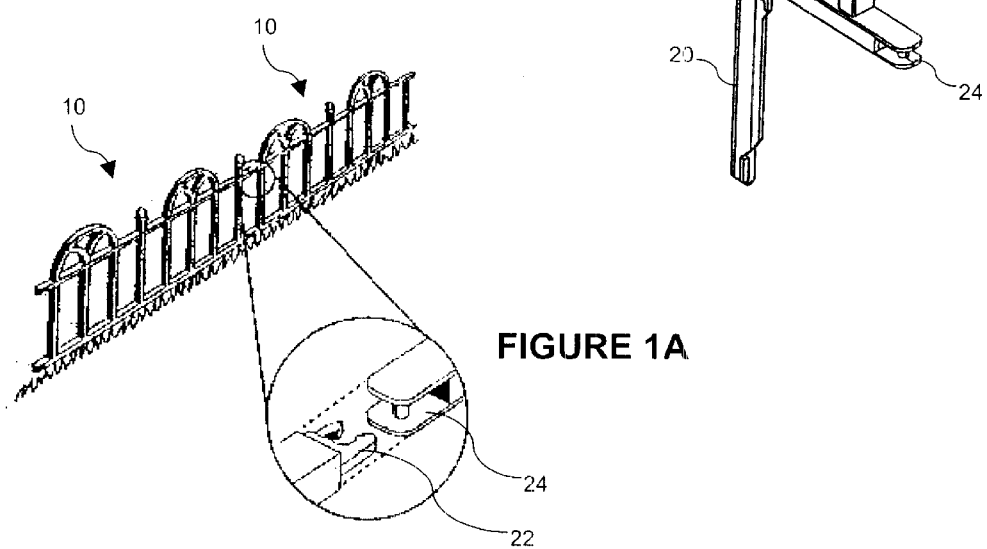

Segment 10 of FIG. 1 also has a plurality of spikes 20 connected to lower horizontal member 12 and extending downward away from upper horizontal member 14. Spikes 20 are formed to be inserted into the ground or other supporting material and to then provide support to hold segment 10 in a desired position. As shown in the embodiment of FIG. 1, segment 10 has two spikes 20 aligned with associated vertical members 16, and each spike 20 has a generally T-shaped cross section with perpendicular front and back surfaces. Segment 10 also has connection features 22 and 24 formed at the ends of lower horizontal member 12 and upper horizontal member 14 to allow multiple segments 10 to be removably connected end-to-end. As shown in more detail in FIG. 1A, one set of connection features 22 can be female, and the other set of connection features 24 can be male such that connection features 22 and 24 can snap-locked together to secure segments 10 end-to-end.

Segment 10 can be constructed from a number of materials suitable for landscape edging, including plastic, metal and wood. In the embodiment of FIG. 1, segment 10 is constructed as an integral piece of durable molded plastic. However, in other embodiments, components of segment 10 can be removably connected to one another. For example, stylistic features 18 could be formed to be removably connected to upper horizontal member 14 to allow for ease of removal and replacement to modify the style. As should be understood, multiple segments 10 can be connected end-to-end to form decorative border fencing for landscape features that is relatively inexpensive and easy to install.

Figure 2:
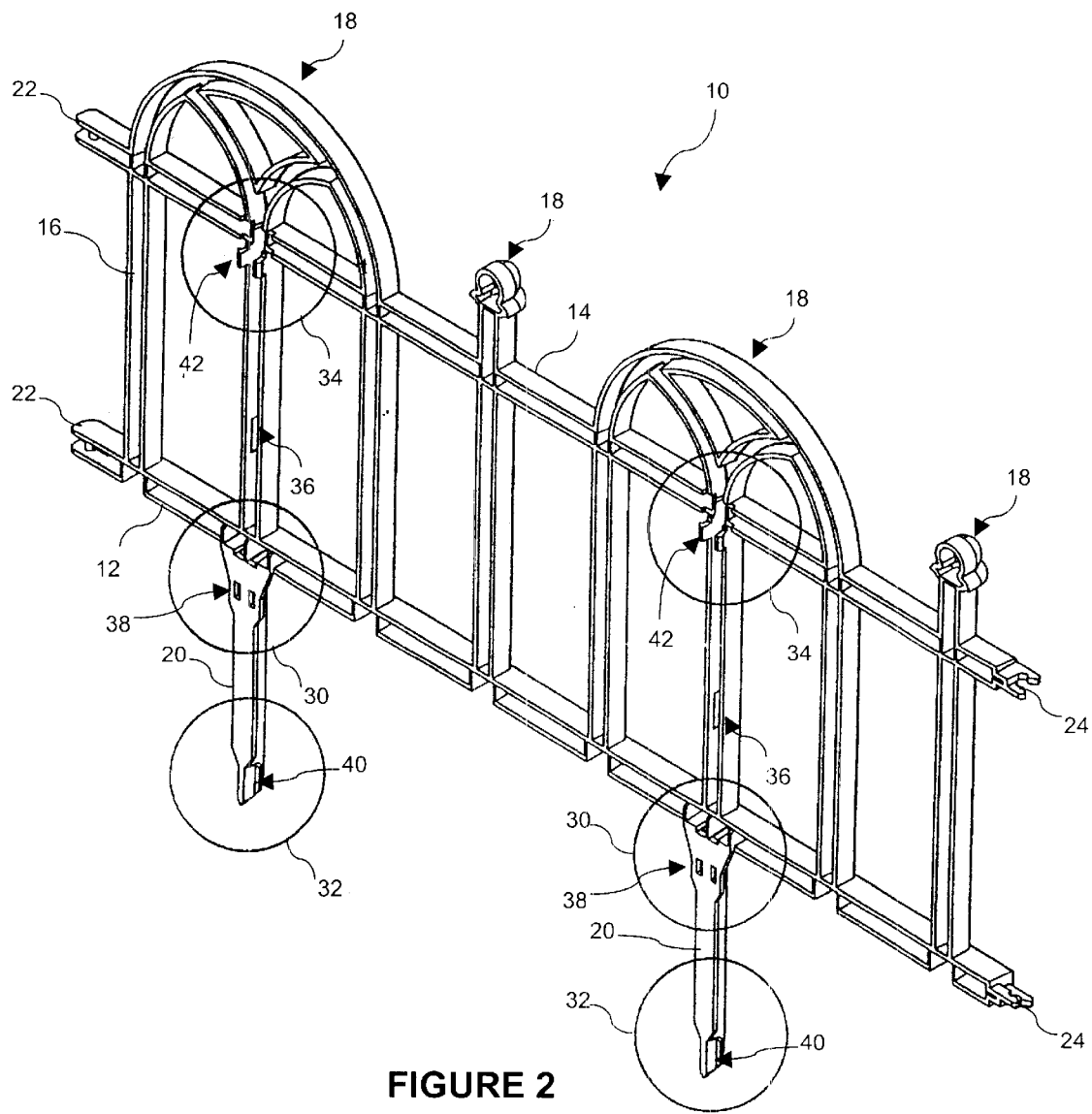
FIG. 2 is a back perspective view of one embodiment of a segment of landscape edging in accordance with the present invention.

FIG. 2 is a back perspective view of one embodiment of segment 10 of landscape edging in accordance with the present invention. As shown, segment 10 has stacking connection features formed on its back that enable segment 10 to be stacked and interlocked with another matching segment 10 to form multiple layers. In the embodiment of FIG. 2, each segment 10 has lower stacking connection features 30 and 32 and upper stacking connection features 34 and 36. As shown, stacking connection feature 30 comprises a pair of openings 38 formed in the back surface of spike 20. Each spike 20 also has a second lower stacking connection feature 32 that comprises a pair of opposing tabs 40 extending outward from each side of the front surface of spike 20. Upper stacking connection features 34 are formed in vertical members 16 that are aligned with spikes 20. In this embodiment stacking connection features 34 each comprise a pair of tabs 42 extending backward from vertical member 16 and formed to engage openings 38 of a matching stacked segment 10. Tabs 42 are also formed to extend away from one another in a generally U-shaped orientation. Upper stacking connection features 36 each comprise a pair of notches in the interior of aligned vertical members 16 formed to receive tabs 40 of a matching stacked segment 10.

Figure 3A:
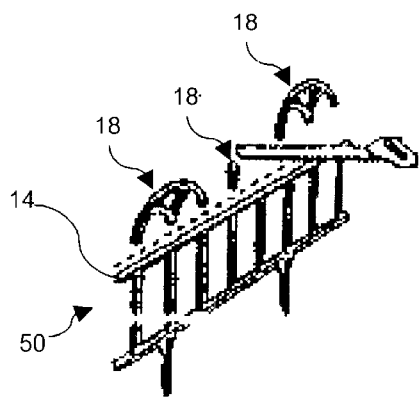
FIGS. 3A and 3B are front perspective views of one embodiment of preparing and stacking segments of landscape edging according to the present invention.
Figure 3B:
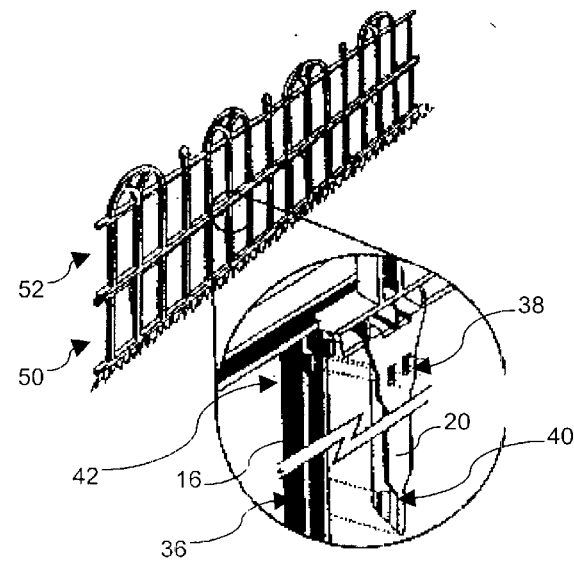

FIGS. 3A and 3B are front perspective views of one embodiment of preparing and stacking segments of landscape edging according to the present invention. As shown in FIG. 3A, a lower segment 50 is first prepared for stacking by removing stylistic features 18. In an embodiment where segment 10 is an integral structure, this removal can be accomplished by cutting off stylistic features 18 flush with upper horizontal member 14. In other embodiments, stylistic features 18 might be removable components and could be removed without cutting.

After lower segment 50 is prepared, an upper segment 52 can be stacked on top of and connected to lower segment 50 to form multi-layered landscape edging. In this embodiment upper segment 52 is connected to lower segment 50 by aligning spikes 20 of upper segment 52 with those vertical members 16 of lower segment 50 that are aligned with spikes 20 of lower segment 50, Then, as shown, tabs 40 of upper segment 52 are inserted into and received by notches of the upper connection feature 36 of lower segment 50, and openings 38 of upper segment 52 receive tabs 42 of lower segment 50.

Figure 4:
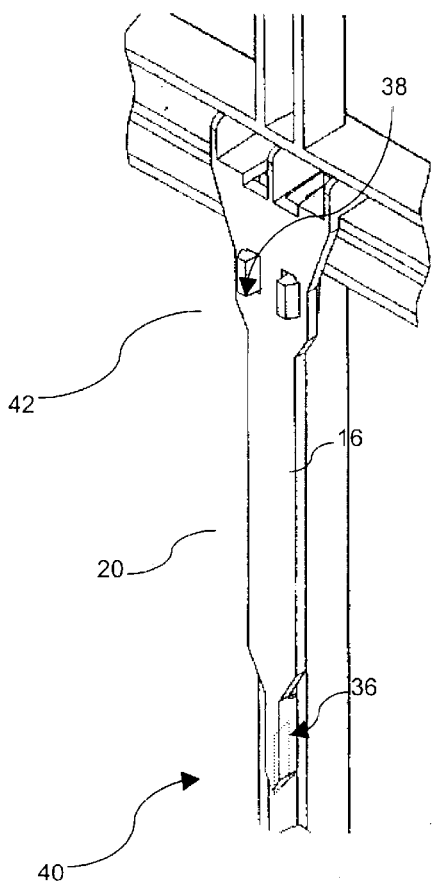
FIG. 4 is a perspective close-up view of one embodiment of connection features for stacking segments of landscape edging according to the present invention having upper and lower segments locked in place.

FIG. 4 is a perspective close-up view of one embodiment of the connection features for stacking segments of landscape edging according to the present invention. As shown, tabs 42 and notches of the upper connection feature 36 of the lower segment have respectively engaged openings 38 and tabs 40 of the upper segment. The interior location of notches of the upper connection feature 36 hold tabs 40 securely inside vertical member 16, and the U-shaped orientation of tabs 42 provide a secure hold on spike 20 through the edges of openings 38.

Figure 5:
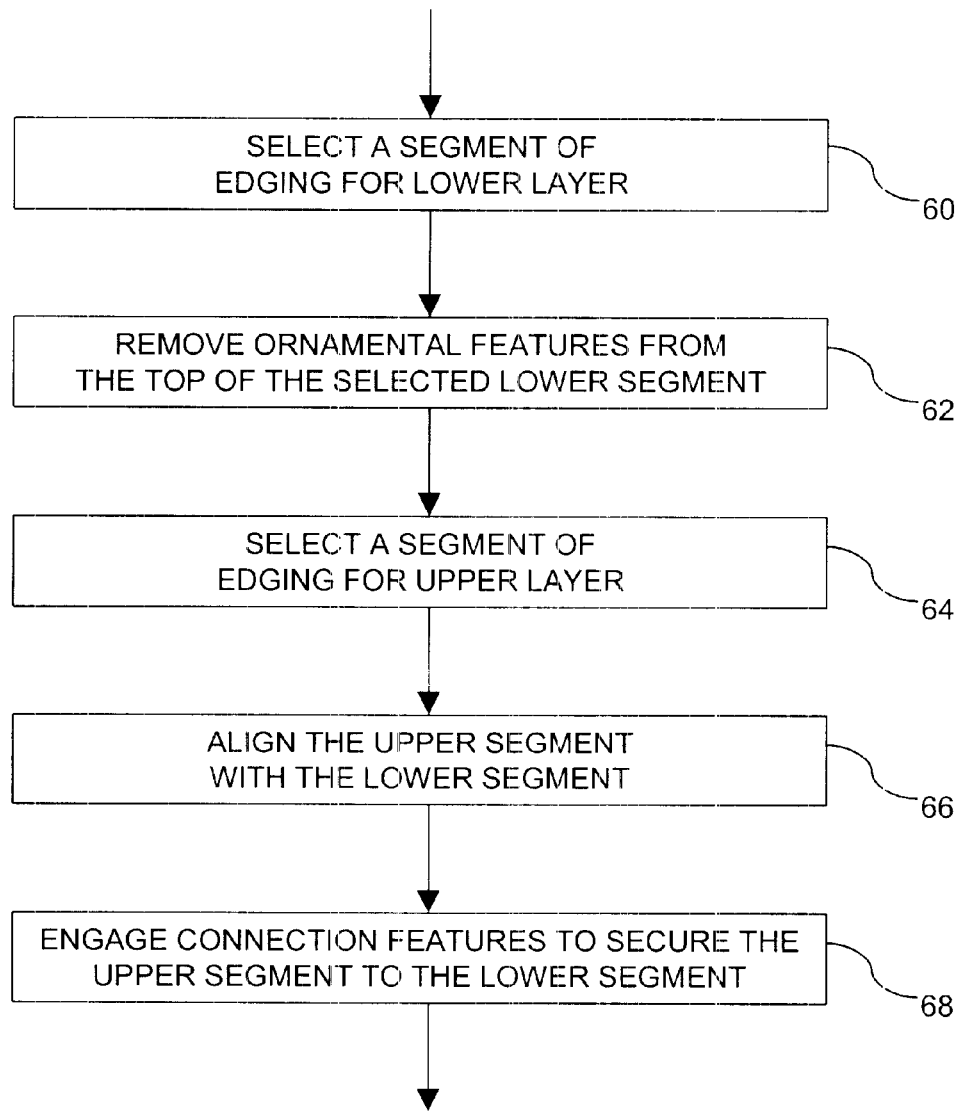
FIG. 5 is a flow chart of one embodiment of a method for stacking segments of landscape edging according to the present invention.

FIG. 5 is a flow chart of one embodiment of a method for stacking segments of landscape edging according to the present invention. In step 60, a segment of edging is selected for the lower layer. The stylistic features, if any, are then removed from the top of the selected lower segment in step 62. In step 64, a segment of edging is selected for upper layer, and the upper segment is aligned with the lower segment in step 66. The connection features of each segment are then engaged with one another in step 68 to secure the upper segment to the lower segment. This process can be repeated as needed to add additional layers of segments and to produce additional multi-layer stacks of segments.

Figure 6:
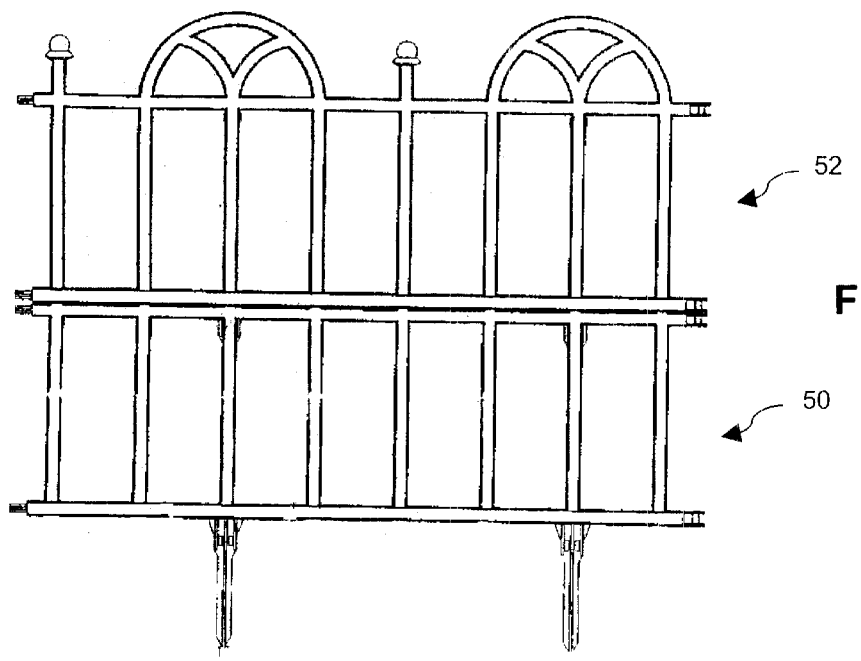
FIG. 6 is a front view of one embodiment of a pair of stacked segments of landscape edging according to the present invention.
Figure 7:
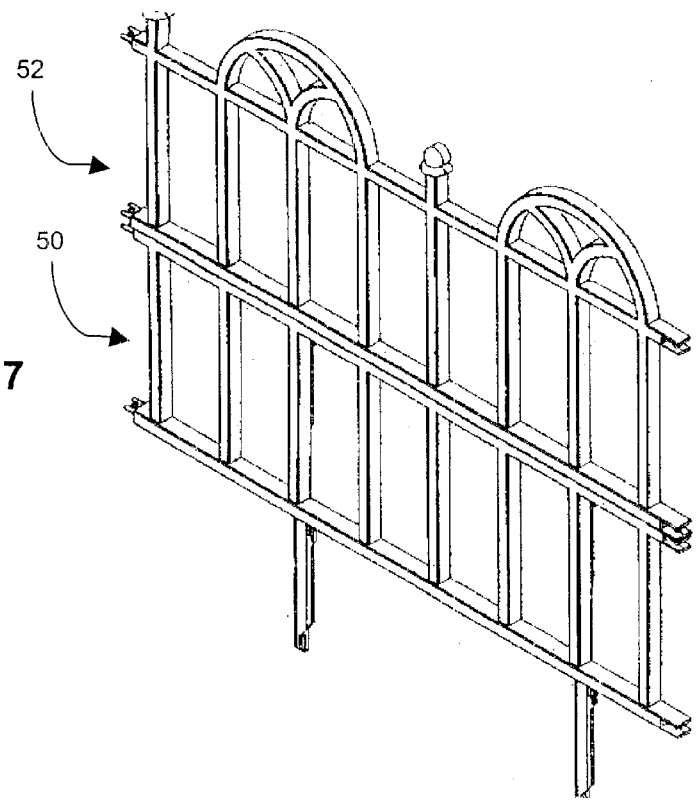
FIG. 7 is a front perspective view of one embodiment of a pair of stacked segments of landscape edging according to the present invention.

FIG. 6 is a front view and FIG. 7 is a front perspective view of one embodiment of a pair of stacked segments 50 and 52 of landscape edging according to the present invention. To install stacked segments 50 and 52, lower segment 50 is inserted into the ground or other support material along the desired border. And, stacked segments 50 and 52 can be connected end-to-end with other stacked segments in the manner described above.

Though shown herein as a single integral piece, segments 10 may be formed from multiple parts. For example, spikes 20 may be formed as detachable pieces that are, therefore, removably attachable to both an upper segment and a lower segment. Further, as mentioned above, stylistic features 18 may be removably attachable to the segment 10.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

What is claimed is:

1. A stackable landscape edging segment, comprising:
   a landscape edging elongated body;
   a lower stacking connection feature coupled to the landscape edging elongated body;
   an upper stacking connection feature coupled to the landscape edging elongated body, the upper stacking connection feature formed to connect to a matching landscape edging segment by interlocking with a matching lower stacking connection feature without the use of a connection pin that is separate from the landscape edging segment to interlock the upper stacking connection feature and the lower connection stacking feature; and
   a plurality of spikes connected to and extending downward from the landscape edging elongated body;
   wherein each spike includes at least one of the lower stacking connection feature, and wherein the landscape edging elongated body comprises a plurality of upper stacking connection features, each associated with and aligned with one of the spikes.

2. The stackable landscape edging segment of claim 1, wherein the landscape edging elongated body comprises:
   an upper horizontal member;
   a lower horizontal member; and
   a plurality of vertical members interconnecting the upper horizontal member and the lower horizontal member.

3. The stackable landscape edging segment of claim 1, further comprising a plurality of stylistic features connected to and extending upward from the landscape edging elongated body.

4. The stackable landscape edging segment of claim 1, wherein the stackable landscape edging segment is constructed as an integral body.

5. The stackable landscape edging segment of claim 1, wherein the stackable landscape edging segment is constructed to have removable components.

6. A stackable landscape edging segment, comprising:
   a landscape edging elongated body;
   a lower stacking connection feature coupled to the landscape edging elongated body;
   an upper stacking connection feature coupled to the landscape edging elongated body, the upper stacking connection feature formed to connect to a matching landscape edging segment by engaging with a matching lower stacking connection feature without the use of a connection pin that is separate from the landscape edging segment to engage the upper stacking connection feature and the lower connection stacking feature; and
   a plurality of spikes connected to and extending downward from the landscape edging elongated body, wherein each spike includes at least one lower stacking connection feature and wherein the landscape edging elongated body comprises a plurality of upper stacking connection features, each associated with and aligned with one of the spikes,
   the lower connection feature including at least a first lower stacking connection feature comprised of a pair of openings formed in the spike at a position proximate the landscape edging elongated body, and a second lower stacking connection feature comprised of a pair of tabs extending from the spike at a position distal the landscape edging elongated body.

7. The stackable landscape edging segment of claim 6, the upper connection feature comprising:
   a first upper stacking feature comprised of a pair of tabs extending from the landscape edging elongate body at a position distal an associated spike, the pair of tabs formed to engage the pair of openings of a matching lower connection feature; and
   a second upper stacking feature comprised of a pair of notches in the landscape edging elongate body at a position proximate an associated spike, the pair of notches formed to receive the pair of tabs of a matching lower connection feature.

8. Multi-layer stacked landscape edging, comprising:
   a first landscape edging segment having at least one upper stacking connection feature; and
   a second landscape edging segment having at least one lower stacking connection feature;
   wherein the lower stacking connection feature and the upper stacking connection feature are formed to interlock with one another to connect the second landscape edging segment above the first landscape edging segment without the use of a connection pin that is separate from the landscape edging segments to interlock the upper stacking connection feature and the lower connection stacking feature, and
   wherein the second landscape edging segment comprises at least one spike connected to and extending downward from an elongated body, the lower stacking connection feature formed on the spike.

9. The multi-layer stacked landscape edging of claim 8, further comprising a plurality of the spikes, wherein the first landscape edging segment comprises a plurality of upper stacking connection features, each associated with and aligned with one of the spikes.

10. The multi-layer stacked landscape edging of claim 8, wherein the first and second landscape edging segments are each constructed as an integral body.

11. The landscape edging segment of claim 8, wherein the first and second landscape edging segments are each constructed to have removable components.

12. Multi-layer stacked landscape edging, comprising:
    a first landscape edging segment having a plurality of upper stacking connection feature; and
    a second landscape edging segment having a plurality of lower stacking connection feature;
    the lower stacking connection features and the upper stacking connection features formed to engage with one another to connect the second landscape edging segment above the first landscape edging segment without the use of a connection pin that is separate from the landscape edging segments to engage the upper stacking connection features and the lower connection stacking features,
    wherein the second landscape edging segment comprises a plurality of spikes connected to and extending downward from an elongated body, the lower stacking connection features formed on the spikes,
    wherein each of the plurality of upper stacking connection features is associated with and aligned with one of the spikes, wherein each lower stacking connection feature comprises a pair of openings formed in the spike at a position proximate the elongated body and a pair of tabs extending from the spike at a position distal the elongated body.

13. The multi-layer stacked landscape edging of claim 12, wherein each of the upper stacking connection features comprises:

a pair of tabs extending from the elongate body at a position distal an associated spike, the pair of tabs formed to engage the pair of openings of a matching lower connection feature; and a pair of notches in the elongate body at a position proximate an associated spike, the pair of notches formed to receive the pair of tabs of a matching lower connection feature.

14. A method of using stackable landscape edging segments, comprising:

selecting a first landscape edging segment for a lower layer;

selecting a second landscape edging segment for an upper layer;

aligning the second landscape edging segment with the first landscape edging segment; and engaging stacking connection features of the first landscape edging segment with stacking connection features of the second landscape edging segment to form multi-layer landscape edging without the use of a connection pin that is separate from the landscape edging segments to engage the stacking connection features, wherein aligning comprises:
aligning a first pair of tabs extending from the first landscape edging segment with a pair of openings formed in the second landscape edging segment; and
aligning a pair of notches formed in the first landscape edging segment with a second pair of tabs extending from the second landscape edging segment.

15. The method of claim 14, wherein engaging comprises:

connecting together the first pair of tabs and the pair of openings; and connecting together the pair of notches and the second pair of tabs.

16. A method of manufacturing a stackable landscape edging segment, comprising:

forming a landscape edging elongated body;

forming a lower stacking connection feature coupled to the landscape edging elongated body;

forming an upper stacking connection feature coupled to the landscape edging elongated body, wherein the upper stacking connection feature is formed to connect to a matching landscape edging segment by interlocking with a matching lower stacking connection feature without the use of a connection pin that is separate from the landscape edging segment to interlocking the upper stacking connection feature and the lower connection stacking feature; and forming a plurality of spikes connected to and extending downward from the landscape edging elongated body, wherein forming the spikes comprises forming each spike to include the lower stacking connection feature.

17. The method of claim 16, wherein forming the landscape edging elongated body comprises:

forming an upper horizontal member;

forming a lower horizontal member; and interconnecting a plurality of vertical members between the upper horizontal member and the lower horizontal member.

18. The method of claim 16, further comprising forming a plurality of stylistic features connected to and extending upward from the landscape edging elongated body.

19. The method of claim 16, wherein forming the landscape edging elongated body comprises forming a plurality of the upper stacking connection features, each associated with and aligned with one of the spikes.

20. The method of claim 16, wherein the stackable landscape edging segment is formed as an integral body.

21. The method of claim 16, wherein the stackable landscape edging segment is constructed to have removable components.

22. A method of manufacturing a stackable landscape edging segment, comprising:

forming a landscape edging elongated body;

forming a plurality of lower stacking connection features coupled to the landscape edging elongated body;

forming a plurality of upper stacking connection features coupled to the landscape edging elongated body, wherein the upper stacking connection features are formed to connect to a matching landscape edging segment by engaging with matching lower stacking connection features without the use of a connection pin that is separate from the landscape edging segment to engage the upper stacking connection features and the lower connection stacking features; and forming a plurality of spikes connected to and extending downward from the landscape edging elongated body, wherein forming the spikes comprises forming each spike to include at least one of the lower stacking connection features, wherein forming the landscape edging elongated body comprises forming a plurality of upper stacking connection features, each associated with and aligned with one of the spikes, wherein forming the spikes further comprises forming each lower stacking connection feature on the spike to comprise:
a pair of openings formed in the spike at a position proximate the landscape edging elongated body; and
a pair of tabs extending from the spike at a position distal the landscape edging elongated body.

23. The method claim 22, wherein forming the upper stacking connection features comprises:

forming a pair of tabs extending from the landscape edging elongate body at a position distal an associated spike, the pair of tabs formed to engage the pair of openings of a matching lower connection feature; and forming a pair of notches in the landscape edging elongate body at a position proximate an associated spike, the pair of notches formed to receive the pair of tabs of a matching lower connection feature.

* * * * *